No. 836,950. PATENTED NOV. 27, 1906.
E. A. WILCOX.
GASKET.
APPLICATION FILED NOV. 20, 1905.
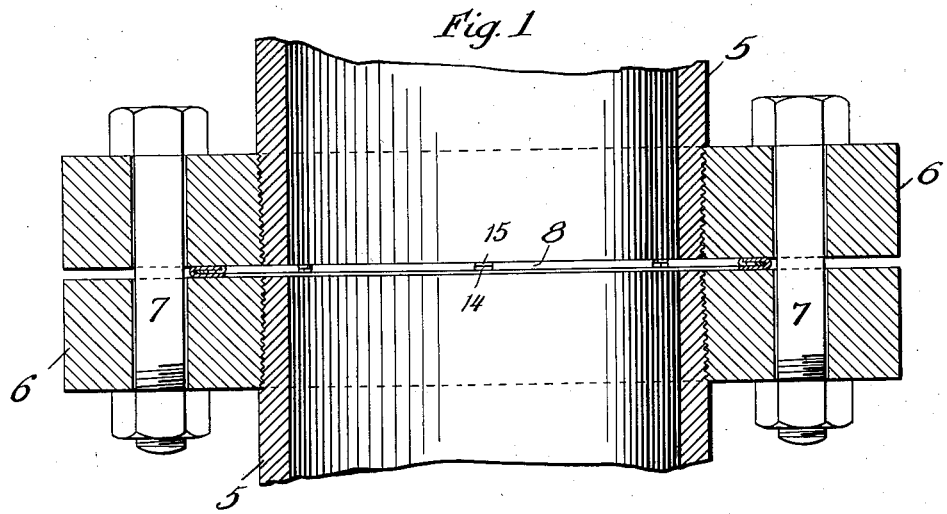
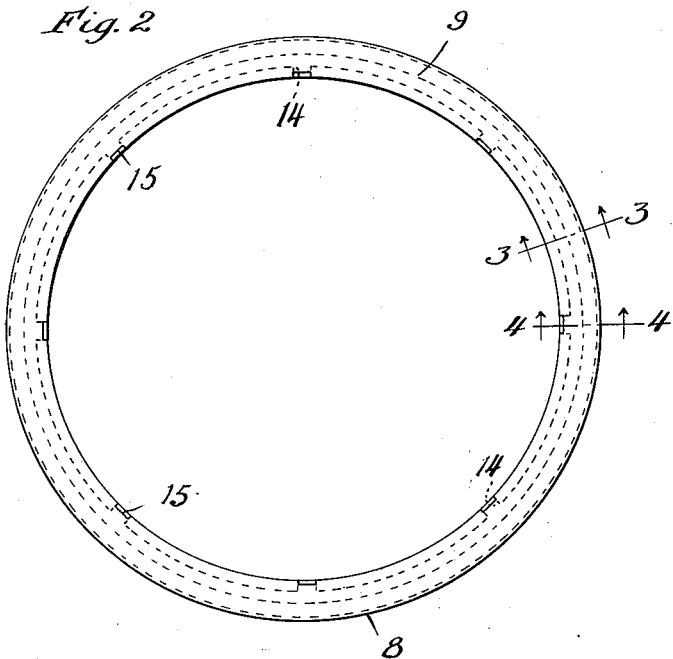
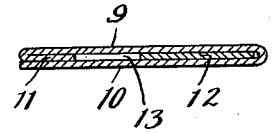
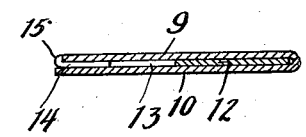
Witnesses:
Inventor:
Elmer A. Wilcox
By Munday, Evarts & Adcock,
Attorneys

UNITED STATES PATENT OFFICE.

ELMER A. WILCOX, OF CHICAGO, ILLINOIS.

GASKET.

No. 836,950.   Specification of Letters Patent.   Patented Nov. 27, 1906.

Application filed November 20, 1905. Serial No. 288,158.

*To all whom it may concern:*

Be it known that I, ELMER A. WILCOX, a citizen of the United States, residing in Chicago, in the county of Cook and State of Illinois, have invented a new and useful Improvement in Gaskets, of which the following is a specification.

It is now customary to pack the joints of pipes through which steam, water, air, oil, acids, alkalies, and other fluids and mixtures are passed at varying temperatures with gaskets of various kinds, some being of rubber, fibrous material impregnated or mixed with rubber, paper, asbestos, &c. These are all short lived, as they are subject to disintegration by the fluids in the pipes or are otherwise rendered ineffective. Soft copper has also been used in the manufacture of the gaskets, both in the flat form and corrugated; but while copper is less liable to destruction than the other packings above mentioned, and readily conforms itself to the unevennesses of the flange-faces of the joint it is defective nevertheless because of its lack of resiliency, so that it does not expand and keep the joint tight when the latter opens by reason of a change in temperature or from other cause. In other words, the copper gaskets when once compressed remain compressed and do not relax when the compression relaxes, so that the joint then commences to leak.

My invention relates to the construction of the copper gasket, and my endeavor in the invention has been to overcome the difficulty arising from the non-resilience of the metal. This I do by providing the gasket with an interior chamber or passage to which the fluid in the pipes has access and the walls of which are flexible, so that they are adapted to yield to the pressure from the fluid, and thus expand said walls against the faces of the joint and so maintain the tightness of the joint.

The construction of the gasket is more particularly described below and also illustrated in the accompanying drawings, in which—

Figure 1 is a sectional view of a pipe-joint provided with my improved gasket. Fig. 2 is a plan view of the gasket detached, and Figs. 3 and 4 are sections thereof on the lines 3 3 and 4 4, respectively, of Fig. 2.

In said drawings, 5 5 represent the pipe-sections united at the joint, each being provided with a flange 6 6, through which the bolts 7 7 are passed. The gasket is shown at 8. It is made of soft copper or other metal spun into form, constructed, preferably, in two pieces. The flat faces of the gasket 9 and 10 are in one piece, the metal being doubled upon itself, and between these face portions I insert the doubled-under edge 11 of the part 9 and a separate flat piece 12, of a thickness corresponding to the part 11. The piece 12 and the doubled-under edge 11 are separated from each other, as plainly shown at Figs. 3 and 4, leaving a chamber or passage 13, which is continuous throughout the entire gasket, having but a single thickness of the metal upon either of the flat sides. The doubled-under part 11 is cut away at intervals, as shown at 14 in Figs. 2 and 4, so as to connect the chamber 13 with the interior fluid-holding part of the pipe, thereby giving the fluids in the pipe access to said chamber. It will thus be seen that the gasket is made in three thicknesses or plies at each edge with its central portion or zone having only two thicknesses or plies. The face portion 9 may be cut away at each of the openings 14, as shown at 15, if desired; but this is entirely optional.

It will be seen from the construction described that the interposed portions 11 and 12 are adapted to keep the face portions 9 and 10 apart, notwithstanding the compression which is put upon the gasket, and thus to maintain the integrity of the chamber 13 and the entrances 14 thereto, so that the chamber admits the fluid from the pipes, and the fluid being under pressure acts upon the walls 9 and 10 of the chamber and expands them outwardly against the flanges of the joint. In this manner the joint is kept tight, notwithstanding the changes in the joint which occur with every change of temperature and sometimes from other causes. The fact that the metal is not resilient becomes immaterial, because of the expansibility imparted to the faces 9 and 10 by the pressure of the fluid in the pipe.

While I have illustrated the invention as applied to a pipe-joint, it will be understood that it may be used elsewhere.

By making the flat sides 9 and 10 in one piece I entirely prevent any leakage occurring between these sides, as the escape of fluid from within the gasket to the outside of the joint is thus shut off.

I claim—

1. A soft metal expansible gasket adapted to be clamped between parallel flanges of united pipe-sections, such ring having an internal chamber receiving the steam or other pressure from the pipe through a radial opening or openings extending from said chamber inward to the interior of the pipe.

2. A soft metal expansible gasket adapted to be clamped between parallel right-angled flanges of united pipe-sections, such ring having an internal chamber receiving the steam or other pressure from the pipe through a radial opening or openings extending from said chamber inward to the interior of the pipe.

3. A soft metal expansible gasket adapted to be clamped between parallel flanges of united pipe-sections, such ring having an internal chamber formed by giving the gasket three thicknesses of metal around its inner and its outer edges and only two thicknesses between such edges, such chamber receiving the steam or other fluid under pressure through a radial opening or openings communicating with the interior of the pipe.

4. The expansible gasket for the unions of flanged pipe-sections and similar joints, formed of flat metal bent into ring form with the metal doubled upon itself, the edges of the metal being both at the inside of the ring and one of said edges being doubled under to prevent the flat sides of the ring from coming together when the ring is compressed.

5. The expansible gasket for the unions of flanged pipe-sections and similar joints, formed of a flat metal bent into ring form with the metal doubled upon itself, the edges of the metal being both at the inside of the ring, the ring being also provided between said edges with means for holding them apart so that they are not forced into contact with each other by the pressure upon the gasket.

ELMER A. WILCOX.

Witnesses:
EDW. S. EVARTS,
WILLIAM A. GEIGER.